United States Patent Office 3,528,689
Patented Sept. 15, 1970

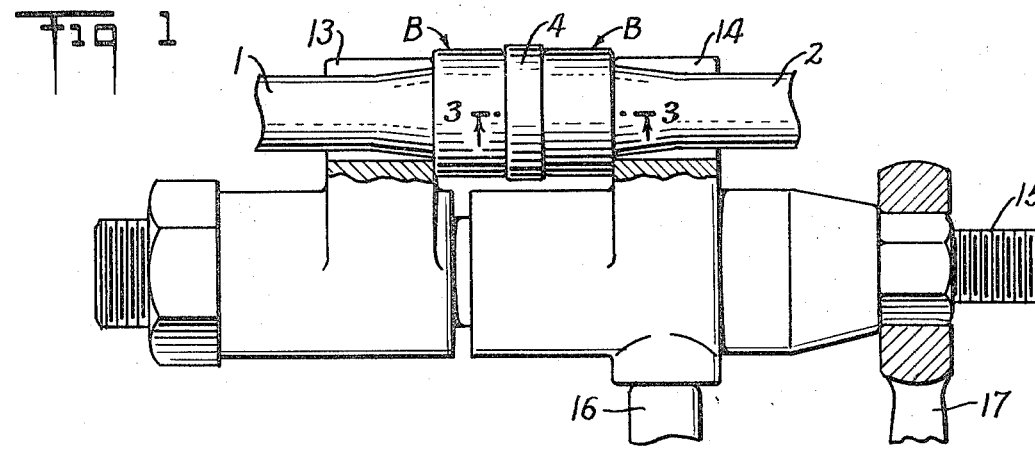
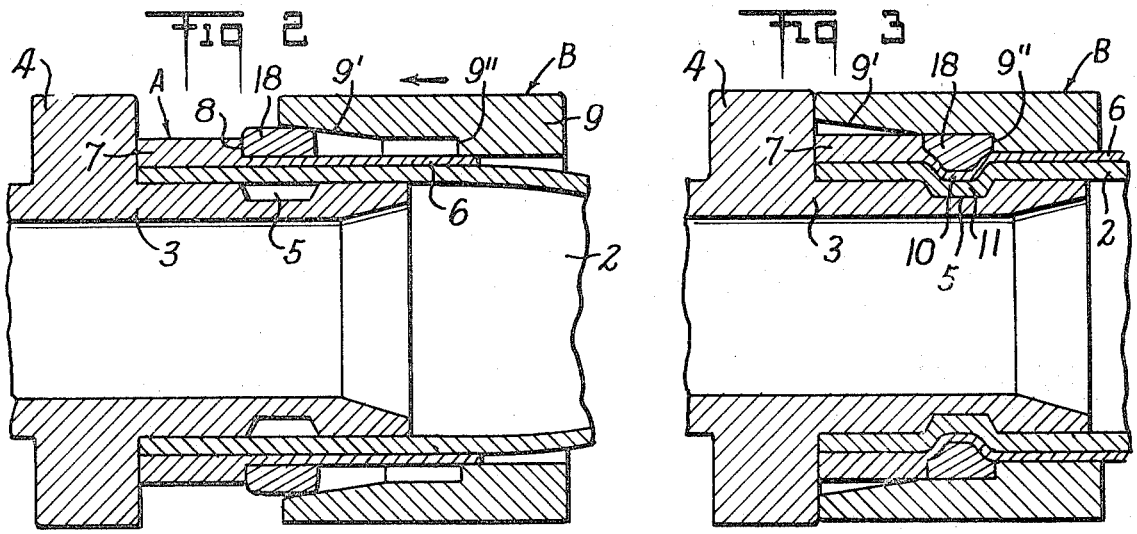
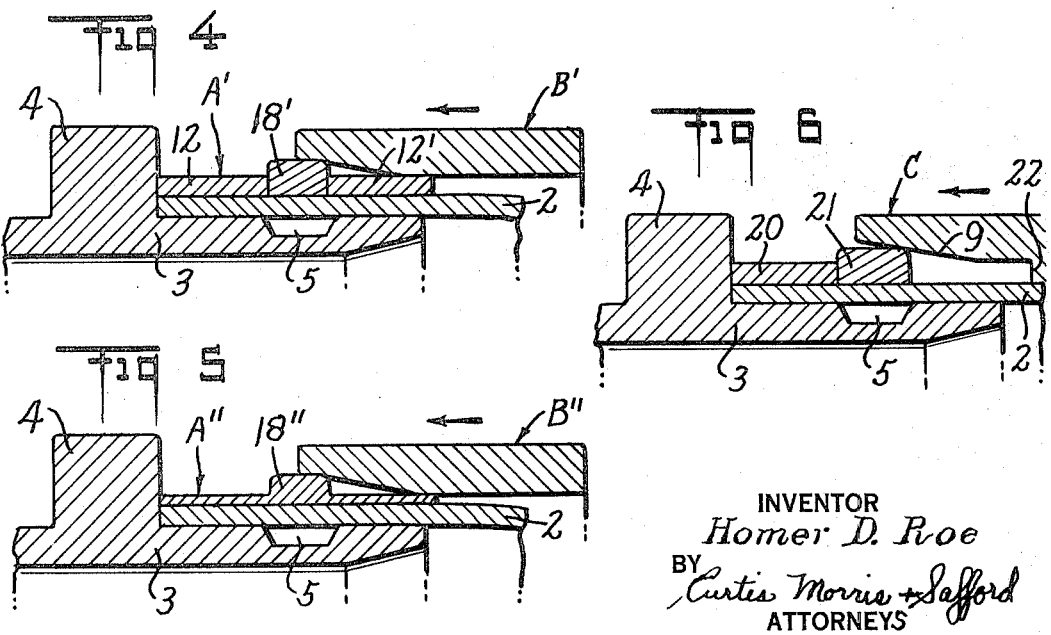

3,528,689
TUBE JOINT
Homer D. Roe, 8 Chapin Place,
Huntington, N.Y. 11743
Filed Dec. 22, 1967, Ser. No. 692,772
Int. Cl. F16l 13/14
U.S. Cl. 285—382.2      2 Claims

ABSTRACT OF THE DISCLOSURE

A connection for use with conduit tubing has a rigid tubular coupling formed with an annular peripheral groove and adapted in use to be positioned with the grooved portion telescoped into the open end of a tube and includes an inner sleeve comprising a malleable portion secured coaxially on the tube and coupling so as to provide an annular radially inwardly directed interlock with an annular indentation in the tube, which indentation in turn interlocks with the coupling groove, and a rigid outer sleeve is mounted coaxially on the inner sleeve to retain said interengaged parts in permanent interlocked relation.

---

The present invention relates to a tube joint or connection.

In producing said joint or connection, a relatively rigid outer sleeve formed to include an annular wedge portion is brought into telescoping engagement over an inner sleeve element having a relatively malleable annular part or zone while said parts are assembled coaxially with a rigid tubular coupling telescoped in the tube, and said outer sleeve is moved axially to force its wedge portion across said malleable part of the inner sleeve to effect annular radial displacement inwardly of said malleable part or portions thereof and of the tube embraced thereby into interlocking relation with the coupling groove, thus in effect, confining said interlocked malleable parts radially between the rigid outer sleeve and the rigid coupling.

Conventional or known types of joints or connections which function effectively under moderate or normal conditions commonly become impaired when subjected to extremes of heat, cold or internal pressure or to externally applied tensions, stresses and strains. Thus, where the joint involves interengaging parts of substantially different coefficients of expansion, said parts tend to separate under extremes of temperature thereby permitting leakage of confined fluids. Similar impairment commonly occurs when the joint is subjected to mechanical or other forces, as internal pressure, tension, twisting, bending or the like. Also, some metals, commonly used in fluid conducting systems, become unduly brittle when exposed to excessive cold, as when conveying fluids at greatly reduced temperatures. In some installations where the joint is closed by using threaded parts, it is difficult to detect imperfect seating except by relatively complex tests.

An object of the present invention has been to provide a conduit pipe or tube joint or connection which remains effective in widely varying environments and extreme conditions of use; which involves relatively few inexpensive parts of simple design; which can be assembled in operative condition in the shop or on the job with the aid of simple tools and in a relatively short time; which provides a permanent tamper-proof connection between tubes or the like, or between fittings and tubes employed for various purposes, as in systems for conducting widely diverse kinds of fluids under extreme conditions of temperature, pressure, chemical content of the fluid, and vibratory or other adverse forces, or in assemblies including tubular elements and fittings; which provide more effectively secure connections for tubes of thinner gauge and lighter weight fittings; and which are readily inspected by visual examination.

In general, a joint embodying my invention as employed to join an end portion of a tube of malleable material to a tube, fitting or the like in a conduit assembly comprises an assembly wherein a tubular coupling of rigid material and having a peripheral annular groove and a peripheral annular flange is securely clamped in telescoping engagement in and interlocked with an open end portion of the tube. An inner sleeve including a portion of relatively malleable material has inwardly radially extending annular portions of said material engaged coaxially with indented annular portions of said tube; and said indented portions of the tube engage coaxially with and seat securely in said groove; and an outer relatively rigid sleeve coaxially engages peripheral portions of said inner sleeve to retain the same in effective clamping engagement with the tube and to maintain radially inwardly indented annular portions thereof in interlocking sealing contact with said groove.

In a procedure to produce such a joint, the component parts advantageously comprise a rigid tubular coupling element having a peripheral groove and a peripheral flange, an inner sleeve including an annular relatively malleable part or zone and a rigid outer sleeve formed with an interiorly tapered portion to provide an annular wedge or interiorly facing conical cam face. In a fluid conducting system which includes tubing of relatively malleable material, a grooved part of the coupling is telescoped into an end portion of the tube. The inner sleeve is slidably positioned coaxially on said end portion of the tube with said relatively malleable part of the inner sleeve disposed radially opposite the coupling groove and with an end edge bearing against a lateral face of said peripheral flange of the coupling. The outer sleeve is coaxially arranged on the tube with its tapered interior or wedge portion overlapping peripheral portions of said malleable part of the inner sleeve. With the components so arranged on a tube, said outer sleeve is forced axially across said malleable part of the inner sleeve toward said flange of the coupling, whereby said wedge portion of the outer sleeve is forced over said malleable portion of the inner sleeve thereby radially deforming the same or displacing or swaging portions thereof inwardly and also deforming or indenting the encircled underlying portion of the tube into interlocking and sealing engagement with the coupling groove.

An illustration of a leak resisting joint or connection according to my invention and in forms designed for various uses and a clamping tool are shown in the drawings appended hereto, which also indicate steps of a procedure wherein said tool is employed in producing such a joint.

In said drawings:

FIG. 1 is a side elevation of a portion of tubing in a fluid-conducting system including a completed in-line joint permanently connecting opposed tube ends therein and a clamping tool in operative position at the end of the clamping step in producing said joint.

FIG. 2 is a fragmentary view on enlarged scale in central longitudinal section of the component parts of the joint shown in FIG. 1 as initially assembled on an end portion of a malleable tube and prior to the step of applying pressure axially in a direction to force the external or outer sleeve from its initial position across a relatively malleable portion of the composite inner sleeve member to its final or locking position, or as shown in FIGS. 1 and 3.

FIG. 3 is a fragmentary view on enlarged scale in central longitudinal section showing in detail the completed joint structure incorporating the parts as shown in FIG. 2.

FIG. 4 is a fragmentary view on enlarged scale in central longitudinal section of a modification wherein the inner sleeve includes a relatively malleable band interposed between more rigid bands.

FIG. 5 is a fragmentary view in central longitudinal section of joint parts in modified form prior to clamping and wherein the inner sleeve is, in effect, an integral ring of malleable metal having a peripheral annular bead which is deformed or displaced radially inwardly in the step of swaging and producing the interlock between tube and coupling in a manner indicated in FIG. 3.

FIG. 6 is a fragmentary view on enlarged scale in central longitudinal section of the outer and inner sleeve parts in further modified form.

As shown in FIG. 1, an embodiment of the invention is employed to join opposed ends of malleable tubes 1 and 2, as in a fluid conducting system. The component parts of the joint assembly for this purpose, as arranged prior to completion of the joint, FIG. 2, include a rigid tubular coupling or connector 3 having a peripheral annular flange 4, FIG. 3, and an annular groove 5. The grooved portion of coupling 3 is of a diameter to telescope snugly into the open end portion of tube 2 with the end edge of said tube 2 abutting against a lateral face or stop shoulder of flange 4. It is noted that the open end of tube 2 may advantageously be expanded, as shown, to receive the telescoped grooved portion of coupling 3 so that the latter may not substantially or unduly reduce the effective normal flow of fluid through the system. Said component parts also include an inner sleeve A and an outer sleeve B.

Said inner sleeve A, as seen in FIG. 2 and prior to completion of the joint, is a band of malleable metal having a relatively thin portion 6, a thick portion 7 and a shoulder 8, assembled with a malleable ring 18 embracing said thin portion 6 and laterally abutting said shoulder 8. As a step in producing a joint, said parts of sleeve A are engaged coaxially on tube 2, FIG. 2, so that ring 18 is, in effect, radially alined with groove 5.

A rigid outer sleeve B including a relatively thick portion 9, an annular wedge portion 9' and a shoulder 9" is initially engaged coaxially on tube 2 and inner sleeve A as seen in FIG. 2.

In the modification shown in FIG. 4, the composite inner sleeve A' comprises a malleable ring 18' mounted between more rigid bands 12 and 12' coaxially on tube 2 and with ring 18' radially alined with groove 5 of coupling 3. When rigid outer sleeve B' is pressed axially toward the left, across 12', 18' and 12, FIG. 4, and into final position corresponding to that of sleeve B as seen in FIG. 3, ring 18' will be swaged or forced inward radially, thus, deforming or annularly indenting tube 2 into interlocking and sealing engagement with groove 5, where it is permanently secured by sleeve B'.

In the modification shown in FIG. 5, inner sleeve A" is conveniently in the form of an integral malleable band having a bead or radially extending annular rib 18" positioned initially in radial alinement with groove 5 coaxially on tube 2. The joint is completed by forcing rigid outer sleeve B" in the direction of the arrow, FIG. 5, until the inner edge of said sleeve B" abuts the lateral face of flange 4, or, as seen in FIG. 3. This causes bead or rib 18" to be deformed or swaged in a manner to deform or annularly indent tube 2 into groove 5 and thereby to permanently interlock said tube indentation in sealing contact with groove 5.

Said outer sleeve B, for example, is arranged and adapted to effect by use of a suitable tool, FIG. 1. the final locking and sealing step in producing the subject joint and thereafter to secure the component parts in locked and sealing relation to the tube 2. Accordingly, outer sleeve B is formed with a conical interior face or annular wedge 9', the taper being such that the leading end diameter of the conical face permits the wedge initially to engage and then to be forced across ring 18 or similar part, in the direction of the arrow, FIG. 2, thereby to displace the projecting malleable material radially inwardly against and thus to deform the thin portion 6 of inner sleeve A at 10 and annularly indent tube 2, at 11, FIG. 3.

Similar deforming, swaging or metal flow of the ring bead and rib parts, FIGS. 4, 5 and 6, induce similar effects on said parts and on tube 2 as those shown in FIG. 3.

In the modification, FIG. 6, the inner sleeve is in two parts, a rigid band 20 and a malleable ring 21, both engaged coaxially on tube 2 along with an outer sleeve C having an annular shoulder 22; and an annular wedge part 9 is also mounted coaxially on tube 2 so that when said sleeve C is pressed in the direction of the arrow across ring 21 to bring its inner annular edge into abutting contact with the opposed face of flange 4, ring 21 or portions thereof will be displaced radially inwardly to deform or indent underlying portions of tube 2 into groove 5, as at 11, FIG. 3.

The diametric dimensions of the component joint parts will advantageously be such that, when initially assembled on tube 2, the rigid coupling part 3 and the inner sleeve A, or sleeve parts, will fit slidably on the tube; and a portion of the outer sleeve B will slidably engage on the malleable deformable or displaceable part of the inner sleeve and another portion of the outer sleeve will slidably engage on another part. Said interengagements of the parts will thus be such that, when the final step i.e. application of axially directed pressure to outer sleeve B without torque is in process, the tube and the inner sleeve will be and remain substantially confined or restained against longitudinal displacement while portions thereof are displaced or swaged radially inwardly toward the coupling groove.

To ensure conforming and effective sealing and shear resisting contact of the annular indented portion of the tube with the coupling groove, the dimensions of the groove and the ring, rib or bead are preferably such that the volume of the deformed or displaced portion of said malleable part is in excess of the volume of groove 5 so that when the axial thrust of the outer sleeve displaces or causes the swaging or metal flow radially inwardly to annularly indent the malleable tube, the thus displaced or deformed portion of said tube will engage in close contiguity and with effective compression substantially the entire concave surface of the groove.

The final swaging, displacing or mechanical welding step of the procedure above described is conveniently accomplished by any suitable clamping or pressure applying tool. As seen in FIG. 1, a convenient hand tool for the purpose comprises interiorly threaded jaws 13 and 14 bifurcated to straddle tubes 1 and 2 and mounted on a threaded spindle 15. A handle 16 secured in jaw 14 enables the operator to hold the clamp in operative position, as seen in FIG. 1, and to actuate a ratchet device of appropriate or known design conveniently including a lever 17 whereby said jaws are moved toward each other to exert the required clamping pressure simultaneously on the outer sleeves B. With slight modification, a similar clamp can be employed to close or complete a joint between a tube and a 90° angle or other type fitting.

In view of the foregoing description considered with the accompanying drawings, it appears that embodiments of my invention provide not only facility and economy in production but also advantageous characteristics in use.

The improved joint structure as above described may, for example, be used to good effect in fluid conducting systems or other structures employing light gauge malleable tubes such as those made of various suitable materials such as aluminum alloys, stainless steel, copper alloys, or the like, due in part to the fact that said joint is made without applied torque and the connection involves no interengagement of threaded parts and presents no abrupt or sharp edges between one part and another to reduce the thickness of or to weaken the tube or tube parts in connection with which it is employed.

TEST I

In testing joints embodying or employing the inner sleeve design of FIG. 5, I used aluminum tubing, type 3003–0 of ½′ outside diameter with nominal wall thickness of .049 and ½′ OD with nominal wall thickness of .058, respectively, in temperatures from approximately 70 to −320 F. at 600 p.s.i. pressure. Helium gas was the working fluid in the tested system. No sign of leakage appeared.

TEST II

Impulse test: Soft tubing as in Test I ½ OD x .049 gauge was subjected to impulse tests up to 108,000 cycles at 0–1500 p.s.i. No leaks or impairment of the joint appeared during or after test.

TEST III

Burst test: The same tubing as in II was pressurized until the tube wall burst at 3,000 p.s.i. with no leaks, deformation or impairment occurring in the point assembly.

It appears that the malleable sleeve part and the engaged tube in joint or connection constituted and produced as above described become, in effect, an integral mechanically fused or mechanically welded or swaged tamper-proof joint wall which is effectively confined and protected in use against distortion or weakening by and between the rigid outer sleeve and the rigid coupling.

What is claimed is:

1. Tube joint construction for use with relatively malleable tubes in a conduit assembly comprising a tubular coupling or relatively rigid material having a peripheral annular groove, the grooved portion thereof being engaged in an open end portion of the tube, an inner sleeve embracing said tube and including malleable portions in radially inwardly conforming engagement with an annular indentation of the tube which indentation extends radially into conforming engagement with said groove of the coupling, and an outer sleeve of material more rigid than that of said malleable portions of the inner sleeve and of the tube and being arranged coaxially on the tube and compressively engaging said malleable portions of the inner sleeve which are in operative interlocking engagement with said annular indentation of the tube, thereby to retain said compressed malleable portions against expansion and to retain said tube in interlocking shear resisting sealing engagement with said annular groove of the coupling, said inner sleeve including a portion less malleable than the tube and more malleable than the outer sleeve, whereby, when the outer sleeve compressively engages said inner sleeve, an annular malleable portion of said sleeve is in effect swaged into interlocking and sealing engagement with said annularly indented portion of said tube.

2. Tube joint construction for use with relatively malleable tubes in a conduit assembly comprising a tubular coupling of relatively rigid material having a peripheral annular groove, the grooved portion thereof being engaged in an open end portion of the tube, an inner sleeve embracing said tube and including malleable portions in radially inwardly conforming engagement with an annular indentation of the tube which indentation extends radially into conforming engagement with said groove of the coupling, and an outer sleeve of material more rigid than that of said malleable portions of the inner sleeve and of the tube and being arranged coaxially on the tube and compressively engaging said malleable portions of the inner sleeve in operative interlocking engagement with said annular indentation of the tube thereby to retain said compressed malleable portions against expansion and to retain said tube in interlocking shear resisting sealing engagement with said annular groove of the coupling, said tube indentation engaging portions of the inner sleeve being in effect mechanically welded in said indentation and peripherally confined against outward radial expansion by said rigid outer sleeve, and said malleable portion of the inner sleeve being of a lower order of hardness than that of laterally contiguous other portions of said sleeve and engaged in radially conforming contact with said indentation of the tube, and said other portions of the inner sleeve being closely engaged on said tube at axially opposite sides of said indentation.

References Cited

UNITED STATES PATENTS

| | | | |
|---|---|---|---|
| 1,678,640 | 7/1928 | Hall | 285—382 X |
| 1,822,400 | 9/1931 | Heeter | 287—108 |
| 3,149,860 | 9/1964 | Hallesy | 285—382 X |
| 3,284,112 | 11/1966 | Martin | 285—382 X |
| 3,409,314 | 11/1968 | Roe | 285—382.7 X |

REINALDO P. MACHADO, Primary Examiner

W. L. SHEDD, Assistant Examiner

UNITED STATES PATENT OFFICE
CERTIFICATE OF CORRECTION

Patent No. 3,528,689         Dated September 15, 1970

Inventor(s)   Homer D. Roe

It is certified that error appears in the above-identified patent and that said Letters Patent are hereby corrected as shown below:

Column 6, line 8, cancel "and sealing".

Signed and sealed this 5th day of January 1971.

(SEAL)
Attest:

EDWARD M. FLETCHER, JR.          WILLIAM E. SCHUYLER, JR.
Attesting Officer                Commissioner of Patents